June 3, 1947.  C. A. FULMER  2,421,556
CONNECTING ROD BORING MACHINE
Filed Feb. 16, 1944  3 Sheets-Sheet 1

INVENTOR.
Charles A. Fulmer
BY
Murray, Sackhoff & Paddack
ATT'YS

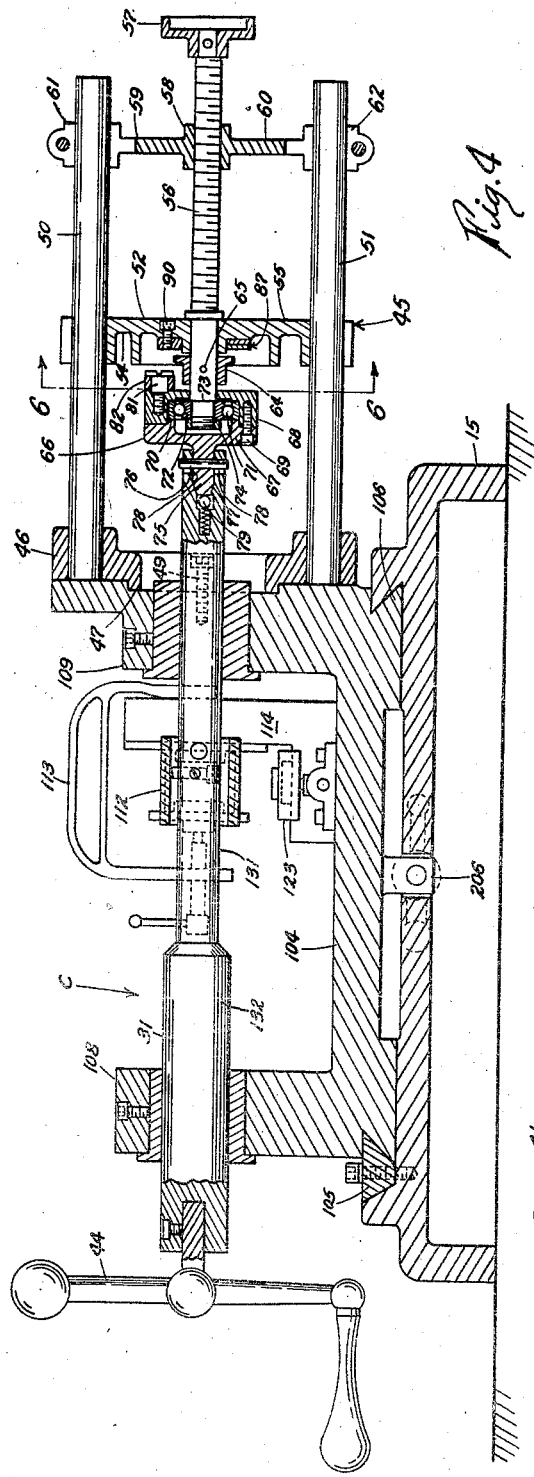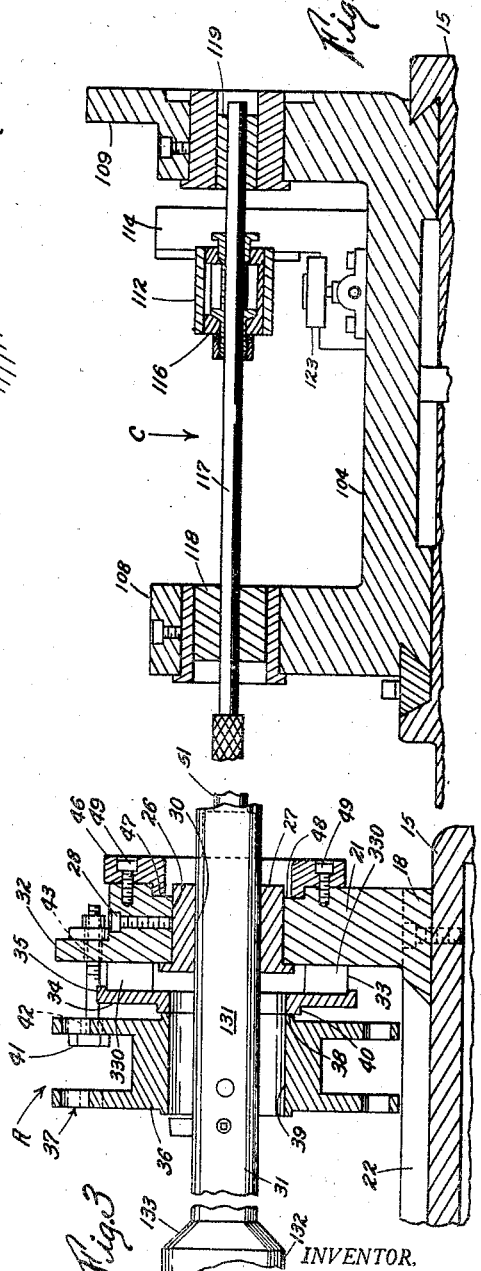

June 3, 1947.                C. A. FULMER                2,421,556
                    CONNECTING ROD BORING MACHINE
                Filed Feb. 16, 1944         3 Sheets-Sheet 3
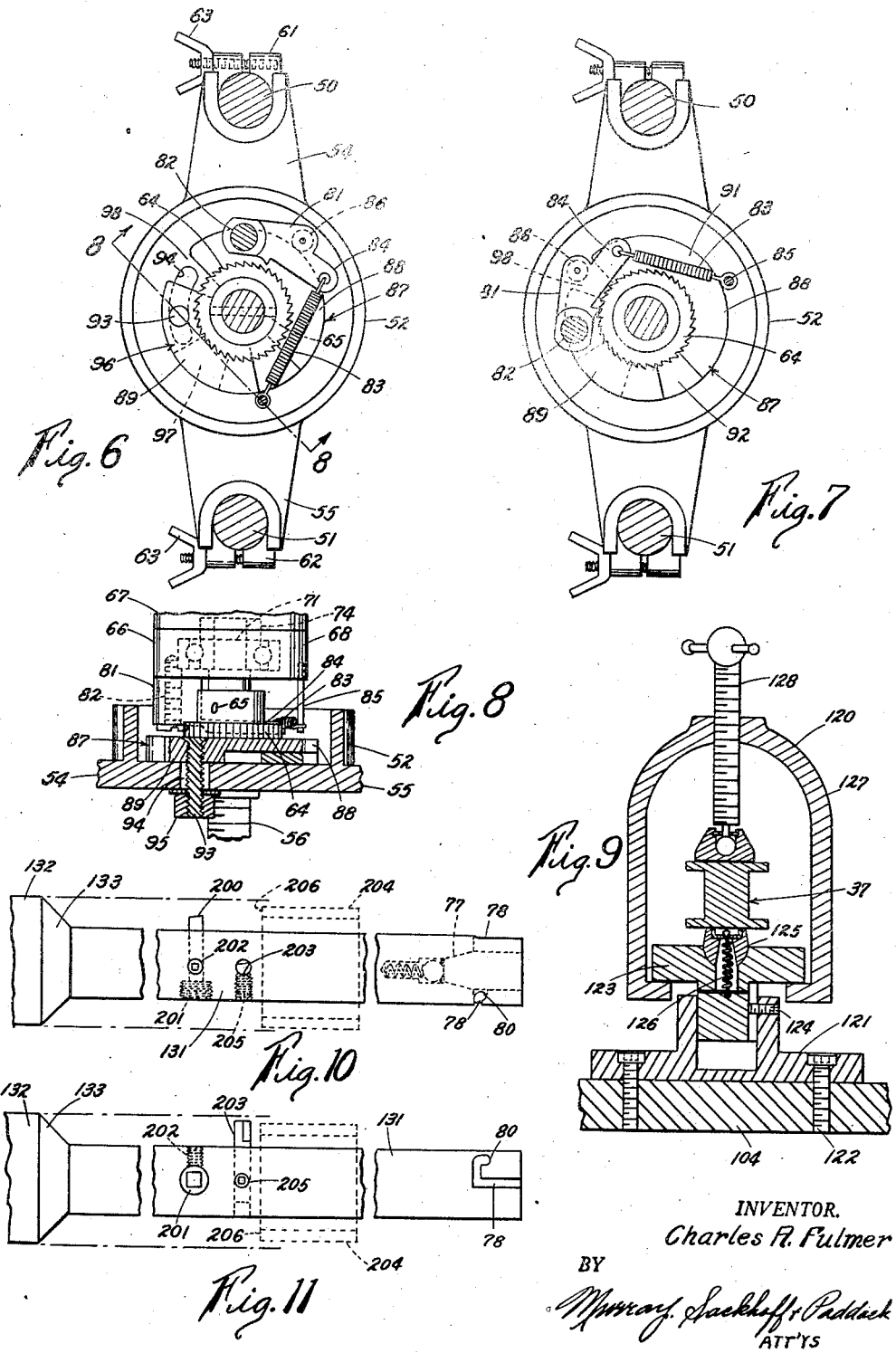
INVENTOR.
Charles A. Fulmer
BY
Murray, Sackhoff & Paddack
ATT'YS Patented June 3, 1947

2,421,556

UNITED STATES PATENT OFFICE 2,421,556

CONNECTING ROD BORING MACHINE

Charles A. Fulmer, Fort Thomas, Ky.

Application February 16, 1944, Serial No. 522,549

3 Claims. (Cl. 77—3)

This invention relates to improvements in boring machines and to a machine of this type which is provided with novel means for effecting the forming and finishing operations on bearing surfaces of connecting rods for combustion engines, or the like; and is particularly directed to a small, universal boring machine for use in aircraft engine repair shops to produce accurate work quickly with unskilled operators.

Heretofore boring machines have been provided for engine repair shop use for servicing the bearing surfaces of engine connecting rods, but these machines were objectionable in that they failed to produce a bearing surface conforming to the minute tolerances required in present day aircraft motors. These conventional boring machines also produced a relatively rough bearing surface which required a subsequent hand finishing operation before the connecting rod could be installed in its operative position in the aircraft motor. Furthermore, no provision has been made in these boring machines for accurately determining the exact parallelism of the axial centers of opposed bearing surfaces, either before or after the rod has been serviced by said machines, and little assurance is therefore obtained as to the true parallelism of the finished bearing surfaces or the straightness of the rod connecting said bearing surfaces. The conventional boring machines are structurely and functionally limited to one boring operation on a single bearing surface of a connecting rod. These machines require considerable adjustment in conditioning them for this operation, and highly skilled operators are necessary for this limited use.

It is therefore an object of this invention to provide a boring machine which, in one operation, produces a finished cylindrical surface for a connecting rod bushing which has minute tolerances, without the necessity of a subsequent hand fitting operation.

Another object of the invention is to provide, in a boring machine of the type described, a means for intermittently connecting rod bushing to produce an accurately formed, finished surface therefor.

A further object of the invention is to provide a universal machine, having the capacity for servicing both of the bushings in all types of connecting rods for aircraft motors.

Another object of the invention is to provide an improved connecting rod boring machine which has two boring stations disposed in fixed, axial parallelism on the machine base and which serve to check the alignment of the end bushings of a connecting rod and also as operational positions for carrying out boring, facing and chamfering operations successively on said end bushings, said base also having a means thereon for securely mounting the connecting rod between the stations.

A still further object of the invention is to provide a small, universal boring machine which may be set up in improvised service stations for producing finished surfaces for bushings of aircraft motor connecting rods which are accurate as to axial parallelism and of constant diameter within minute tolerances, said finished surfaces being comparable to those produced on large, stationary boring machines employed in engine manufacturing plants.

A still further object of the invention is to provide a boring machine of the class described, which can be readily and efficiently adjusted to perform boring, facing and chamfering operations on the bushings of a connecting rod.

The invention also consists of certain other structural details which will be illustrated in the following specification and drawings, and in which:

Fig. 3 is a fragmental, cross-sectional view through the axial center of the connecting rod bearing shown in Fig. 1.

Fig. 4 is an enlarged cross-sectional view taken on line 4—4 of Fig. 2.

Fig. 5 is a cross-sectional view similar to that shown in Fig. 4, which illustrates the bushing aligning means for the machine.

Fig. 6 is an enlarged cross-sectional view taken on line 6—6 of Fig. 4.

Fig. 7 is a view similar to that of Fig. 6, showing the mechanism in another operative position.

Fig. 8 is a cross-sectional view taken on line 8—8 of Fig. 6.

Fig. 9 is an enlarged cross-sectional view of rod positioning means illustrated in Fig. 1.

Fig. 10 is a fragmental view of the tool bar for my machine, parts thereof being shown diagrammatically.

Fig. 11 is a side elevational view of the tool bar shown in Fig. 10.

Figures 1, 2:
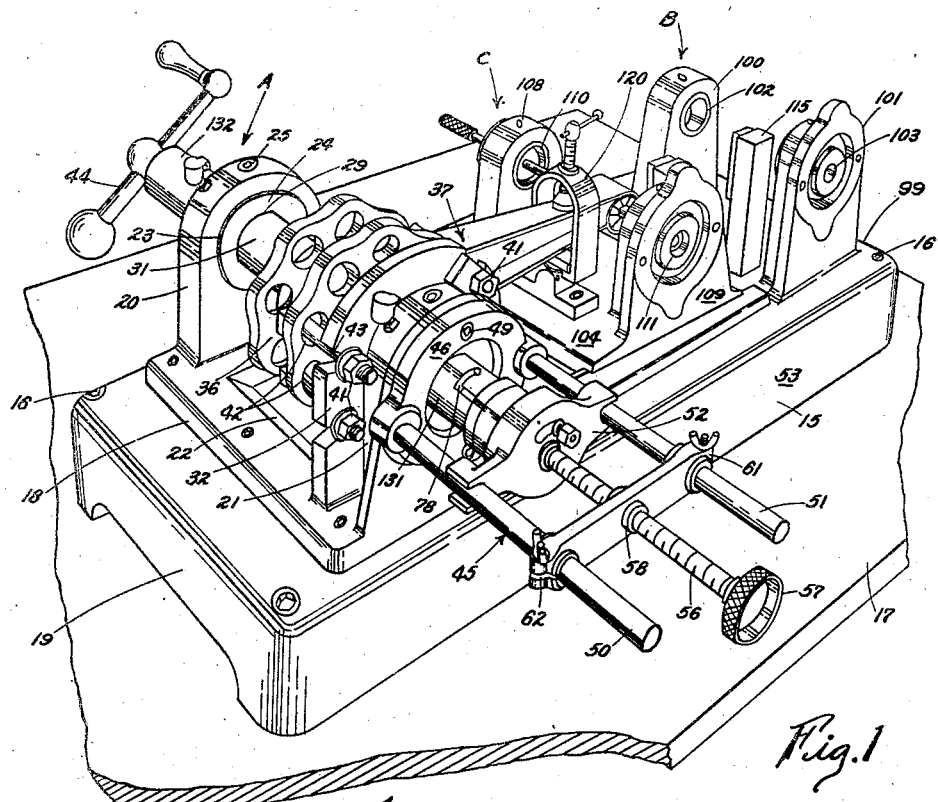
Fig. 1 is a perspective view of my boring machine showing the manner in which it is adapted for operation on the master connecting rod for a radial aircraft motor.
Fig. 2 is a plan view of my machine adjusted for operation on a link connecting rod for a radial combustion engine.

The preferred embodiment of my boring machine consists of a base 15, which is fastened by bolts 16 to a work table 17. The base has two fixed operating stations A and B transversely fixed to the opposed ends of this base, and also carries a longitudinally adjustable station C disposed between the fixed stations. All of these stations are somewhat similar in construction and function and each comprises a pair of transversely spaced bearing blocks having collars mounted therein, said collars being provided with axially aligned bearing holes, for journaling a tool bar. All the axial center lines for each pair of bearing holes are in parallelism. The bearing blocks of these stations which are located adjacent one longitudinal side of the base are provided with relatively large, effective diameters while the bearing blocks near the opposed longitudinal side of the base are adapted to interchangeably mount a tool bar advancing head.

The construction of each operating station and its functions may therefore be understood by the following detailed description of the station A for carrying out operations on the large bushing of a master connecting rod wherein 18 is a mounting plate bolted to one end 19 of the base, and provided with two upstanding bearing blocks 20 and 21, disposed thereon in spaced relation. As is most clearly shown in Figs. 1 and 2, the mounting plate has a centrally disposed well 22 to provide the necessary clearance for the work to be bored. The bearing block 20 (Fig. 1) has formed therethrough a hole 23 for snugly receiving a bearing collar 24, which is secured therein by a bolt 25. As most clearly shown in Fig. 3, the bearing block 21 is provided with a hole 26 for snugly receiving a bearing collar 27. This collar is secured in the block by a bolt 28. The bearing holes 29 and 30, formed in the collars 24 and 27 respectively, are disposed in axial alignment with each other, and are formed to accurately journal the intermediate ends of a two-diameter tool bar 31. The bearing hole 29 is formed with a larger effective opening than the bearing hole 30 for journaling the two-diameter tool bar for purposes to be hereinafter set forth.

The bearing block 21 is provided with a vertically disposed mounting flange 32, and the inner face of said flange has a concentrically disposed extension 33 formed thereon. The outer surface of this extension is accurately ground so that its bearing face is at right angles to the axial center of the bearing holes 29 and 30. An accurately ground cap disc 34 is in engagement with the outer surface of the extension 33, and is provided with a peripheral flange 35 for positioning it on said extension. The extension 33 is provided with two vertically aligned openings 330, to provide a means of observing when the boring operation is completed.

As illustrated in Figs. 1 and 3, the end 19 of the machine base is adapted for boring the large crank shaft bushing 36 on the master connecting rod 37 of an aircraft motor. A shoulder face 38 of the cylindrical bore 39 for this bushing is firmly held against a concentric annular portion 40 formed on the cap disc 34 by means of bolts 41, which pass through link bearing rod holes 42 in the bushings and slots 43 formed in the flange 32 of the bearing block 21. In this manner the cylindrical bushing surface is securely held in parallelism with the axial center of the tool bar. The means for precisely positioning the crank shaft bushing for this master connecting rod so that it is coaxially aligned with the tool bar will be hereinafter described.

The two-diameter tool bar is therefore mounted on the base for axial movement in the spaced bearing blocks 20 and 21. A manually operable crank 44 is removably fastened to the extremity of the large portion of the bar for rotating said bar in one tool actuating direction, so that upon its removal a suitable motor may be connected to the bar if desired. Entrance or withdrawal of the tool bar to or from its operative position in the bearing blocks is effected through the large bearing hole 29, and it will be noted by reference to Figs. 10 and 11 that the diameter of said enlarged portion 132 on the bar is greater than the radial extension of the tools mounted on the small portion 131 of the bar. A tool bar advancing means 45 is mounted on the outer face of the bearing block 21 by means of an annular mounting plate 46, which is provided with a concentric shoulder 47 to cooperate with an annular inset 48, formed in the bearing block 21 for accurately positioning said plate on the block. This mounting plate is secured to the bearing block by opposed bolts 49. Two guide members 50 and 51 extend from the mounting plate and are disposed on opposite sides of the feed bar, the axial centers of said members lying in a common plane with the axial center of said bar, and are adapted to guide a feed head 52 in a rectilinear direction. This bar advancing means is adapted for installation upon any one of the bearing blocks on the front side 53 of the machine base as it is shown in Fig. 1. As illustrated in Figs. 2 and 4, said advancing means is shown positioned upon the central bearing block.

By reference to Fig. 4 and Figs. 6, 7 and 8, the feed head 52 is provided with two opposed arms 54 and 55, which have accurately formed outer surfaces for slidably engaging the guide members 50 and 51 respectively. An advancing screw 56 is journaled for rotary motion in the head and is provided at its outer end with a manually operated wheel 57. A nut 58 threadedly engages the advancing screw and is provided with two opposed arms 59 and 60, which are provided with split sleeves 61 and 62 at their outer ends for encircling the guide members 50 and 51 respectively. Wing nuts 63 are provided for securely clamping the split sleeves to the guide members in any desired transverse position between the limits of said guide members. A ratchet wheel 64 is fastened to the smooth inner end of the screw 56 by a pin 65 which also serves to prevent axial movement of the screw relative to the feed head.

A coupling member 66 is rotatably mounted on the feed head, and as shown in Fig. 4, said coupling member comprises an inner section 67 and an outer section 68, secured together by bolts 69, and having clamped between them the outer race 70 of a ball bearing 71. The inner race 72 of said ball bearing is fastened between a shoulder 73, formed on the extremity of the screw and a nut 74 threaded to said extremity. This coupling member is disposed in axial alignment with the tool bar and is provided with a coaxial extension 75, having a transverse pin 76 extending in opposed directions therefrom. The extension 75 is detachably secured to the extremity of the reduced portion 131 of the tool bar by insertion into a concentric bore 77, formed in said extremity, said opposed pin portions cooperating with opposed bayonet slots 78, formed in the wall of the bar between its outer surface and the said bore. A spring urged ball 79 is positioned in the tool bar and bears against the extension of the coupling member to urge the pin into offset portions 80 (Figs. 1, 10 and 11) formed in the extremities of the bayonet slots for precluding accidental detachment of the coupling member from the bar. It will be noted that this construction permits mutual rotation of the tool bar and coupling member in a tool actuating direction, and upon ball depressing inner movement, and thereafter counter-rotation of the coupling member relative to the bar in a direction opposed to the tool-feeding direction, detachment of said bar and member may be effected.

The means for periodically connecting the bar to the advancing screw for transmitting intermittent rotary movement to the screw from the constantly rotating tool bar comprises a pawl 81, pivoted to the outer face of the coupling member by screw 82. The pawl is biased toward engaged position with the teeth of ratchet 64 by a spring 83, which is secured at one end to an extension 84 on the pawl, and is fastened at its other end to a pin, anchored in the coupling member (Figs. 6, 7 and 8).

The pawl is precluded from contact with the ratchet teeth by means of a cam follower, which takes the form of a roller 86, mounted on the pawl. This roller rides around the periphery of a cam when the tool bar is rotated in a tool-actuated direction.

The means for controlling the increment of motion through which said feed screw periodically moves, takes the form of a cam 87, made of two sections 88 and 89. The cam section 88 is disposed coaxially with the advancing screw, and is fixed to the head by bolts 90, said section being formed with a thick portion 91 and a reduced segmental portion 92. The cam section 89 is rotatably adjustable relative to the fixed portion, by means of a screw 93, fixed to its body portion and extending through an arcuate slot 94, formed in the head 52. A bolt 95 cooperates with the set screw 93 to position the cam section 89 in selective adjustable positions relative to the fixed cam section 88. The rotatable cam section 89 has a thick segmental portion 96, which is movable between the radially extending ends of the thick portion of the fixed cam 88, and a reduced portion 97, which overlies and engages the reduced portion 92 of the fixed cam. By adjusting the position of the movable cam, the arcuate extent of a gap 98 formed between the adjacent radially extending ends of the two cam sections can be varied from a closed position to an extended position.

When the gap 98 is closed, the cam follower 86 precludes the engagement of the pawl with the ratchet wheel, and permits rotation of the feed bar in a fixed transverse plane. The bar, however, can be advanced by manually turning the feed screw by means of the hand wheel 57. Intermittent and automatic axial advancing movement of the feed bar is obtained by adjusting the cam so that a gap is created by the cam sections. The cam follower will then fall into said gap by action of the spring 83 and provide a connection between the feed bar and the advancing screw by contact of the pawl with the ratchet wheel. The increment of motion transmitted periodically to the feed screw may be varied by adjusting the extent of opening of the gap 98 so that a very fine finish may be imparted to the cylindrical bore of the work by the tool, or a relatively rough finish may be provided by extending the arcuate distance between the cam ends forming the gap.

It will be noted that the tool bar is provided with means for mounting two tools in axial spaced relationship. As illustrated in Figs. 10 and 11, the numeral 200 indicates a conventional boring tool which is radially adjusted and backed up in the bar by a screw 201. A set screw 202 holds said tool in adjusted position. A facing tool 203 is mounted in the bar in a position preceding that of the boring tool when said bar is positioned on the base in its initial operating position relative to the cylindrical work 204, secured to the machine base. This facing tool is held in a radial hole in the bar by a set screw 205. To face the bearing surface 206 on the shoulder of the work, the facing tool is advanced to engagement with said shoulder, and the gap in the cam on the bar advancing means is closed so that the pawl and ratchet are inoperative. Facing is then done by manually turning the advancing screw by wheel 57 until a predetermined amount of material is removed from the face. After this operation, the facing tool is removed and the boring operation is initiated under the control of the automatic advancement of the bar by the feed head.

The machine end 99 opposed to the end 19 is provided with two spaced bearing blocks 100 and 101, which are formed integrally on the base, the block 100 being provided with a bearing hole, having an effective opening greater than the bearing hole 103, formed in the block 101. These bearing blocks are similar in construction to the blocks 20 and 21.

Disposed intermediate the ends of the machine is a longitudinally movable carriage 104. This carriage is disposed in spaced guide-ways 105 and 106 (Figs. 4 and 5), and is movable toward or away from the bearing blocks 20, 21 or 100, 101 by a screw 105, rotatably mounted in the base and threadedly engaging a nut 206 depending from the carriage 104. A crank 107 is fastened to the screw to obtain longitudinal adjustment of the carriage relative to the spaced pairs of end blocks.

A pair of spaced bearing blocks 108 and 109 are integrally formed on the carriage, and are provided with axially aligned bearing holes 110 and 111 respectively, said bearing hole 110 having a larger effective diameter than the bearing hole 111.

As illustrated in Fig. 2, my machine is conditioned for a boring operation on a link connecting rod 112 for an aircraft motor, the rod being held in operative position on the machine by means of C-clamps 113, which secure the central portion of said rod to a post 114, extending from the carriage, and a post 115 mounted on the base. These posts are provided with accurately ground faces which position said connecting rod in a plane at right angles to the axial centers of the bearing holes of blocks 100, 101, and 108, 109. As most clearly shown in Fig. 5, the axial center of the bushing is aligned coaxially with the bearing holes in the blocks by means of an adjustable mandrel bar 117. This bar is held in the exact axial center of the bearings by means of collars 118 and 119, which are snugly received in said bearings. A mandrel like the one illustrated in Fig. 5 is inserted into both bushings of a connecting rod, and the carriage adjusted so that said mandrel rods are exactly positioned in the spaced bearing blocks. If upon expanding said mandrels to exactly fit the interior bore of said bushings, it is found that said mandrel rods do not align themselves with their bearing blocks, there is an indication that the axial centers of the bushings are out of parallelism, and said connecting rods should be checked for twist or bend. After said mandrels have exactly positioned the connecting rod, C clamps are tightened against the connecting rod arm, and the mandrels removed from the base through the bearing hole having the large effective diameter. Into this bearing hole is inserted the two-diameter tool bar which has been previously fitted with tools for operation on the bushing. The advancing means is then moved to the proper bearing block for attachment thereto, and the tool bar fixed to the coupling member of said advancing means by interlocking the bayonet slot and pin connection.

As illustrated in Figs. 1 and 9, a particular clamp 120 is employed for accurately fastening the master rod in its operative position. This clamp comprises a block 121 fastened to the carriage 104 by bolts 122. A vertically adjustable member 123 is held in the base by a set screw 124, and is provided with a universally movable engaging member 125, which is held in position by a spring 126. A yoke 127 engages the underside of the member 123, and is provided with a clamping screw 128 which, upon adjustment, securely clamps the connecting rod arm 37 in any vertically selected position.

The operation of the machine will now be described with reference to the various types and sizes of aircraft connecting rods to which the machine may be adapted. The master connecting rod for a radial aircraft engine is positioned in the machine between the operating stations A and C, the station A being adapted for operation on the large crank shaft bushing of said rod. The shorter type of connecting rods, such as the link rods of radial engines, are positioned in the machine between the stations B and C, and it will be noted, by reason of the longitudinal adjustment of the station C, that said machine is universally adapted for use in servicing all sizes and lengths of aircraft motor connecting rods.

In mounting a connecting rod between the stations A and C, mandrels and their associated rods are passed through the opposed bushings of said connecting rod and their axial centers, positioned at the axial center lines of the opposed bearing block holes by means of suitable reducing collars, as is indicated at Fig. 5 of the drawings. The mandrels are then expanded, and as has been indicated, the expansion of said mandrels accurately positions the bushings, so that their axial centers are accurately located in the common center line of the bearing holes formed in the opposed blocks comprising the stations. At this time also a definite check is established as to the occurrence of any bend or twist in the rod arm which connects said bushings, and said condition may then be remedied before the rod is actually positioned on the machine base. When the mandrels have accurately positioned the bearing rod bushings relative to the operating stations A and C, the master rod is fastened to the base by means of bolts 41 and the clamp 120, and thereafter one of the mandrels, such as the mandrel at station A, is removed through the large effective opening 29 formed in the block 20 and a tool bar 31 inserted therethrough. The bar advancing head 45 is then positioned on the block 21 at the station A, and the coupling between the bar and the advancing means, is then made. The facing and then the boring operations on the large bushing of the master connecting rod are carried out in a manner prescribed hereinbefore. It will be noted that upon completion of the boring or facing operations on the large bushing, the mandrel in the small bushing of the master rod may then be removed and the latter bushing can be bored and faced without resetting of the master rod. This is due to the fact that a means such as the bolt mounting 41 and the clamp 120 maintain both the bushings of the master rod in accurate alignment with their respective operating stations. To bore the small end of the master rod, therefore, it is only necessary to remove its mandrel, insert the boring bar, remove the advancing unit from its mounting at station A, fix it to station C, and connect it to the boring bar. When the link connecting rod 112 is mounted for operation between stations B and C the parts 114 and 115 maintain the said rod in its preset position whilst its bushings are successively bored and faced.

While there is shown and described herein certain specific machine structure, particularly adapted for use in carrying out operations on aircraft connecting rods, it will be manifest to those skilled in the art that various modifications may be made to meet similar requirements in related fields without departing from the spirit and scope of the invention, and the same is not limited to the particular machine structure described herein, except in so far as is indicated by the appended claims.

What is claimed is:

1. In a connecting rod boring machine the combination of a base, a fixed boring station disposed on each end of the base, a movable boring station mounted on the base for longitudinal movement between the fixed stations, a rotated tool bar adapted for selective mounting at any one of the said stations for rectilinear movement, a tool bar advancing unit adapted for selective mounting on any one of the stations, a rotationally actuated advancing element in the unit adapted for intermittent, rectilinear movement, and means for detachably coupling the advancing element to the bar when said bar and unit are mounted at a single station, whereby a universal boring machine is provided for producing finished surfaces on both bushings of all types of connecting rods.

2. In a connecting rod boring machine the combination of a base, a pair of fixed boring stations mounted upon the base, opposed bearing blocks for each station, the blocks for each station having formed therethrough transversely aligned, journal bearing holes, the bearing holes for each station being transversely disposed on the base in axially spaced parallelism, a rotatable tool bar adapted for selective mounting in the journal bearings of either station, a feed head adapted to be detachably mounted on one block of each station for rectilinear movement, a rotatable advancing means for the head, a coupling member rotatably mounted on the head, means on the bar for detachably engaging the coupling member, and means for intermittently connecting the coupling member and the advancing means for imparting step-wise movement to said advancing means.

3. In a machine of the class described the combination of a base, a pair of bearing blocks mounted on the base in spaced relationship, a tool bar journaled for axial movement in the blocks and adapted for axial insertion and withdrawal therefrom, means on one end of the bar for rotating said bar in one direction, a feed head mounted on the base for rectilinear movement and disposed adjacent to the other end of said bar, a rotatable advancing means for the head, a coupling member rotatably positioned on the head in axial alignment with the bar, means interposed between the coupling member and the advancing means for imparting step-wise movement to said advancing means in one rotational direction, a bayonet slot formed in the free end of the tool bar, a spring urged ball disposed concentrically within the tool bar adjacent the bayonet slot, and a pin on the end of the coupling member and engageable in the slot upon depression of the ball by the end of said member.

CHARLES A. FULMER.

REFERENCES CITED

The following references are of record in the file of this patent:

UNITED STATES PATENTS

| Number | Name | Date |
|---|---|---|
| 403,240 | Barnett | May 14, 1889 |
| 7,604 | Morrill et al. | Aug. 27, 1850 |
| 1,558,045 | Robertson et al. | Oct. 20, 1925 |
| 1,604,940 | Hempy | Oct. 26, 1926 |
| 1,830,724 | Storm et al. | Nov. 3, 1931 |
| 604,410 | Moore | May 24, 1898 |